UNITED STATES PATENT OFFICE.

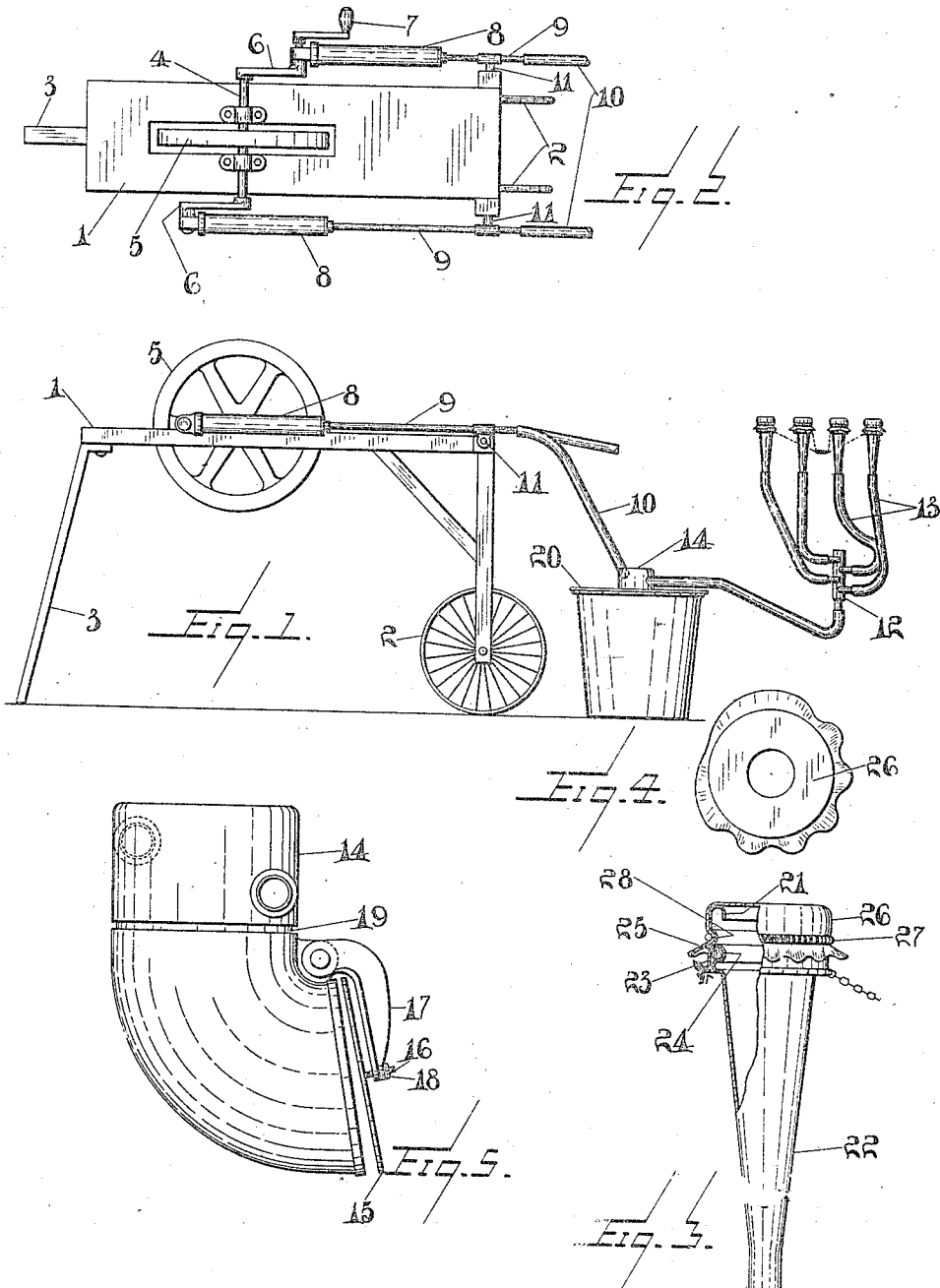

WALLACE C. BROWN, OF TORONTO, ONTARIO, CANADA.

MILKING APPARATUS.

1,149,246.

Specification of Letters Patent.

Patented Aug. 10, 1915.

Application filed July 18, 1914. Serial No. 851,742.

*To all whom it may concern:*

Be it known that I, WALLACE C. BROWN, of the city of Toronto, in the county of York, Province of Ontario, Canada, a subject of the King of Great Britain, have invented certain new and useful Improvements in Milking Apparatus, of which the following is a specification.

This invention relates to apparatus employing mechanical suction in the milking of cows, and my object is to devise simple and effective apparatus which may be easily operated by one man.

I attain my object by means of the constructions hereinafter specifically described and illustrated in the accompanying drawings in which—

Figure 1 is a side elevation of my improved apparatus; Fig. 2 a plan view of the air pump and its supporting carriage; Fig. 3 a side elevation partly in section of one of the teat cups; Fig. 4 is a plan view of the teat cups; and Fig. 5 a side elevation of the discharge valve.

In the drawings like numerals of reference indicate corresponding parts in the different figures.

1 is a framework preferably provided with a pair of wheels 2 at one end, and a suitable leg 3 at the other end. This framework is thus readily portable to suit the convenience of the user.

The air pump comprises a shaft 4 suitably journaled on the frame 1 provided with the fly wheel 5. Cranks 6 are formed at opposite ends of the shaft 4, and one crank has an operating handle 7 secured thereto. The cranks are set opposite one another and are pivotally connected with the cylinders 8. The piston rods 9 are hollow and to them are connected the lines of pipe 10 leading to the teat cups. The piston rods are pivotally connected with the frame as shown so that the pistons and cylinders rock on the pivots 11 when the air pump is in operation. This forms a very convenient and compact arrangement of the air pump well adapted for my purpose.

The interior construction of the pistons and cylinders is not shown as this may be of any well known form, no valves being necessary.

Each line of piping is connected with a head 12 from which lead the branch pipes 13 leading to the teat cups. Intermediate the ends of each line of piping 10 is placed the discharge valve 14. This is preferably an L-shaped casing suitably adapted for connection with the parts of piping. The lower end of the horizontal part of the L is open and is provided with a hinged valve flap 15. The disk forming the flap is preferably connected by means of the threaded stem 16 with the arm 17 which is pivoted on the valve casing. By rotating the disk the valve may be adjusted to fit the seat accurately, and when adjusted may be locked by means of the lock nut 18 screwed on the stem 16. The valve casing has a groove 19 formed therein adapted to engage a cover 20 which rests on a milk pail, as shown in Fig. 1, when the device is in use.

The construction of the teat cups is shown more particularly in Figs. 3 and 4. Each cup is formed in two parts, the head 21 and the tapered shank 22. The head is preferably substantially cylindrical and is provided with the rim 23. The larger end of the shank is adapted to be telescopically connected with the rim 23, preferably within the same. The joint between the two must of course be air tight, and while metal to metal may make a fairly tight joint I prefer to pack the joint with some resilient packing. For this purpose I form the annular recess 24 in the shank 22 into which is fitted a ring 25 of resilient material which contacts with the inner surface of the rim 23 and makes an air tight joint.

The resilient diaphragm 26 is preferably formed of a sheet of rubber which is stretched over the head 21 as shown and secured to the head by means of the annular spring 27 which clamps the margins of the sheet of material forming the diaphragm against the sides of the head. The spring 27 is preferably a coiled wire spring and preferably also an annular groove 28 is formed in the head into which the spring clamps the margins of the sheet forming the diaphragm. An opening is formed in the diaphragm as usual and the size of this opening, as is evident, may be readily adjusted by stretching the diaphragm out by pulling its margins under the spring. By loosening the spring the diaphragm may be allowed to contract as much as possible. This arrangement is of much importance as not only does it allow the diaphragm to be quickly and easily renewed, but is enables the milker to quickly adapt the teat cups to fit teats of different sizes. The formation of the teat cup in two parts is also of great importance particularly in a one man machine as it enables the teat cup to be fitted without requiring the existence of a vacuum in the teat cup. It is obviously impossible for one man to fit the teat cups and at the same time operate the machine, but with my improved teat cup the fitting of the teat cup in place does not require the existence of a vacuum in the apparatus.

The *modus operandi* is as follows: The diaphragm is adjusted to the proper size, and before or after this operation the parts of the teat cup are separated, the head is then pushed up until the teat partly enters the aperture in the diaphragm. While the head of the teat cup is held up with one hand the milker can readily pull the teat through the diaphragm with his other hand as it is accessible through the open lower end of the head. The lower part of the teat cup is then pressed into place and after all four for the one animal have been thus adjusted the apparatus is in condition for milking to begin.

The device is shown as adapted for milking two animals at once, two pumps being shown each provided with a line of pipe 10. The device is readily adapted, however, without departing from the spirit of my invention, to simultaneously milk a larger number of animals.

What I claim as my invention is:

1. In milking apparatus a teat cup of stiff material formed in two parts detachably connected, one part being provided with and suitably supporting a flexible perforated diaphragm through which a teat may project so that it may be grasped by the operator to enable the diaphragm to be pushed up in place on the teat, the other part being disconnectible without affecting the support of the diaphragm and being of a bore sufficient to freely receive the teat projecting through the diaphragm.

2. In milking apparatus, a tapered teat cup of stiff material divided adjacent its larger end, the parts being detachably connected, the larger part being provided with and suitably supporting a flexible perforated diaphragm through which a teat may project so that it may be grasped by the operator to enable the diaphragm to be pushed up in place on the teat, the other part being disconnectible without affecting the support of the diaphragm and being of a bore sufficient to freely receive the teat projecting through the diaphragm.

3. In milking apparatus, a teat cup comprising a head provided with a cylindrical rim and a flexible perforated diaphragm through which a teat may project so that it may be grasped by the operator to enable the diaphragm to be pushed up in place on the teat, and a shank adapted to be telescopically connected and disconnected with said rim without affecting the support of the diaphragm and being of a bore sufficient to freely receive the teat projecting through the diaphragm.

4. In milking apparatus a teat cup comprising a head provided with a flexible perforated diaphragm and a cylindrical rim, a shank adapted to be telescopically connected with said rim and having an annular recess formed therein, and a flexible washer fitted in said recess and adapted to engage said rim to form an air tight joint.

5. In milking apparatus a teat cup having an open outer end, a sheet of resilient material forming a diaphragm and having a central opening therein, and an annular spring adapted to clamp the margins of the sheet against the sides of the teat cup.

6. In milking apparatus a teat cup having an open outer end and an external annular recess formed adjacent the end, a sheet of resilient material forming a diaphragm and having a central opening therein, and an annular coiled wire spring adapted to clamp the margins of the sheet in said annular recess.

7. A teat cup formed in two parts detachably connected and provided with a resilient apertured diaphragm, and means for adjusting the size of the aperture.

Toronto, Ont., this 11th day of July, A. D. 1914.

WALLACE C. BROWN.

Signed in the presence of—
E. P. HALL,
L. MAE LEWIS.